United States Patent
Kim et al.

(10) Patent No.: US 12,499,704 B2
(45) Date of Patent: Dec. 16, 2025

(54) APPARATUS AND METHOD FOR DETECTING AN OBJECT IN A VEHICLE

(71) Applicants: HYUNDAI MOTOR COMPANY, Seoul (KR); KIA CORPORATION, Seoul (KR)

(72) Inventors: Eung Hwan Kim, Seoul (KR); Seul Ki Jeon, Hwaseong-si (KR); Hui Won Shin, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/625,852

(22) Filed: Apr. 3, 2024

(65) Prior Publication Data
US 2025/0157246 A1    May 15, 2025

(30) Foreign Application Priority Data
Nov. 15, 2023   (KR) .......................... 10-2023-0158469

(51) Int. Cl.
*G06V 40/10*    (2022.01)
*G08B 21/22*    (2006.01)

(52) U.S. Cl.
CPC .......... *G06V 40/103* (2022.01); *G08B 21/22* (2013.01)

(58) Field of Classification Search
None
See application file for complete search history.

(56) References Cited

U.S. PATENT DOCUMENTS

| | | | |
|---|---|---|---|
| 9,569,948 B1 * | 2/2017 | Platt | G08B 21/22 |
| 10,899,317 B1 * | 1/2021 | Moeller | B60R 25/30 |
| 2016/0272150 A1 * | 9/2016 | Doshi | G08B 23/00 |
| 2018/0065504 A1 * | 3/2018 | Lan | B60W 10/30 |
| 2022/0169206 A1 * | 6/2022 | Moeller | G06F 8/65 |
| 2022/0194319 A1 * | 6/2022 | Ben Abdelaziz | B60R 25/31 |

FOREIGN PATENT DOCUMENTS

| | | | | |
|---|---|---|---|---|
| CA | 3058565 A1 | * | 4/2021 | |
| CN | 105389945 A | * | 3/2016 | |
| CN | 208730739 U | * | 4/2019 | |
| CN | 113627570 A | * | 11/2021 | |
| CN | 115891568 A | * | 4/2023 | |
| EP | 3859884 A1 | * | 8/2021 | ............ G01S 13/56 |
| JP | 2021183467 A | * | 12/2021 | |
| KR | 2019045760 A | * | 5/2019 | ............ B60K 28/12 |
| WO | WO-2017073190 A1 | * | 5/2017 | ............... B60N 2/28 |
| WO | WO-2019122414 A1 | * | 6/2019 | ........... A61B 5/0205 |
| WO | WO-2023229064 A1 | * | 11/2023 | ............ B60W 10/30 |

* cited by examiner

*Primary Examiner* — Ricky Chin
(74) *Attorney, Agent, or Firm* — Lempia Summerfield Katz LLC

(57) ABSTRACT

An apparatus and method for detecting an object in a vehicle may monitor start-up of the vehicle and a state of a door. The apparatus and method operate an interior detecting sensor of the vehicle in an infant detecting mode when an engine of the vehicle is turned off and the door is locked. The interior detecting sensor of the vehicle operates in an intrusion detecting mode when no infant is detected. Thus, an infant in the vehicle may be quickly and accurately detected, and an intruder in the vehicle may be detected for a long period of time using low power.

20 Claims, 6 Drawing Sheets

APPARATUS AND METHOD FOR DETECTING AN OBJECT IN A VEHICLE

CROSS-REFERENCE TO RELATED APPLICATION

This application claims the benefit of and priority to Korean Patent Application No. 10-2023-0158469, filed in the Korean Intellectual Property Office on Nov. 15, 2023, the entire contents of which are incorporated herein by reference.

TECHNICAL FIELD

The present disclosure relates to a technology for detecting an object within a vehicle with high accuracy using a sensor (e.g., radar) that detects an interior of the vehicle.

BACKGROUND

Recently released vehicles are equipped with various convenience systems to provide various convenience services to users. For example, the various convenience systems may include a rear occupant alert (ROA) system, a passenger position notifying system, a door dent preventing system, a collision avoiding system, an intrusion sensing system and the like.

These various convenience systems are individually equipped with radar devices and provide various convenience services based on the sensing results of the corresponding radar devices. In this case, the radar device is optimized according to the purpose of the applied convenience system.

This requires a plurality of radar devices, which cause duplication. Thus, a method capable of efficiently controlling one radar device so that the various convenience systems may exhibit optimal performance is required.

The content described in the background section is provided to promote understanding of the background of the disclosure. Thus, the background section may include contents that are not the related art already known to those having ordinary skill in the art to which this technology belongs.

SUMMARY

The present disclosure has been made to solve the above-mentioned problems occurring in the prior art while advantages achieved by the prior art are maintained intact.

Aspects of the present disclosure provide an apparatus for detecting an object in a vehicle and a method therefor. The apparatus and the method may monitor start-up of the vehicle and a state of a door. The apparatus and the method operate an interior detecting sensor of the vehicle in an infant detecting mode when an engine of the vehicle is turned off and the door is locked. The interior detecting sensor of the vehicle operates in an intrusion detecting mode when no infant is detected. Thus, an infant in the vehicle may be quickly and accurately detected, and an intruder in the vehicle may be detected for a long period of time using low power.

Other aspects of the present disclosure provide an apparatus for detecting an object in a vehicle and a method therefor. In the apparatus and the method, performance of the interior detecting sensor of the vehicle is controlled to the maximum values or intensity when the interior detecting sensor of the vehicle operates in the infant detecting mode. The performance of the interior detecting sensor of the vehicle is controlled to the minimum values or intensity when the interior detecting sensor of the vehicle operates in the intrusion detecting mode. Thus, an infant in the vehicle may be quickly and accurately detected, and an intruder in the vehicle may be detected for a long period of time using low power.

Still other aspects of the present disclosure provide an apparatus for detecting an object in a vehicle and a method therefor. In the apparatus and the method, a detection intensity, a detection period, and a detection speed (i.e., processing speed) of the interior detecting sensor of the vehicle are controlled to the maximum values or intensity when the interior detecting sensor of the vehicle operates in the infant detecting mode. The detection intensity, the detection period, and the detection speed of the interior detecting sensor of the vehicle are controlled to the minimum values or intensity when the interior detecting sensor of the vehicle operates in the intrusion detecting mode. Thus, an infant in the vehicle may be quickly and accurately detected, and an intruder in the vehicle may be detected for a long period of time using low power.

Yet other aspects of the present disclosure provide an apparatus for detecting an object in a vehicle and a method therefor. In the apparatus and the method, a first pattern alarm is output when an infant is detected while the interior detecting sensor of the vehicle operates in the infant detecting mode. The interior detecting sensor of the vehicle operates in the intrusion detecting mode when the infant is not detected during a preset period of time. A second pattern alarm is output when an intruder is detected while the interior detecting sensor of the vehicle operates in the intrusion detecting mode. Thus, a user may determine whether an infant is detected or an intruder is detected.

The purposes of the present disclosure may be not limited to the purposes described above. Other purposes and advantages of the present disclosure that are not described herein may be understood by the following description and may be more clearly understood by embodiments of the present disclosure. Further, it should be readily apparent that the purposes and advantages of the present invention may be implemented by units and combinations thereof described in the appended claims.

The technical problems to be solved by the present disclosure are not limited to the aforementioned problems. Any other technical problems not mentioned herein should be more clearly understood from the following description by those having ordinary skill in the art to which the present disclosure pertains.

According to an aspect of the present disclosure, an apparatus for detecting an object in a vehicle includes a sensor that detects movement of the object positioned in an interior of the vehicle. The apparatus also includes a controller that monitors start-up of the vehicle and a state of a door, operates the sensor in an infant detecting mode when an engine of the vehicle is turned off and the door is locked, and operates the sensor in an intrusion detecting mode when no infant is detected.

According to an embodiment of the present disclosure, the controller may set a detection intensity of the sensor to a maximum detection intensity, may set a detection period of the sensor to a shortest detection period, and may set a detection speed of the sensor to a maximum speed, when the sensor operates in the infant detecting mode.

According to an embodiment of the present disclosure, the controller may set a detection intensity of the sensor to a minimum detection intensity, may set a detection period of the sensor to the longest detection period, and may set a detection speed of the sensor to a minimum speed, when the sensor operates in the intrusion detecting mode.

According to an embodiment of the present disclosure, the apparatus may further include an output device that notifies a driver of an infant or an intruder when the sensor detects the infant or the intruder. The apparatus may further include a communication device that communicates with a portable terminal of the driver.

According to an embodiment of the present disclosure, the output device may output a first pattern alarm when the sensor detects an infant and may output a second pattern alarm when the sensor detects an intruder.

According to an embodiment of the present disclosure, the output device may output a warning sound in a first period, may flicker emergency lights of the vehicle, and/or may output an infant notification text as the first pattern alarm.

According to an embodiment of the present disclosure, the communication device may transmit at least one of a message notifying of the presence of an infant or an interior image of the vehicle to the portable terminal of the driver.

According to the embodiment of the present disclosure, the output device may output a warning sound in a second period, may flicker emergency lights of the vehicle, and/or may output an intruder notification text as the second pattern alarm.

According to the embodiment of the present disclosure, the communication device may transmit at least one of a message notifying of the presence of an intruder or an interior image of the vehicle to the portable terminal of the driver.

According to the embodiment of the present disclosure, the controller may acquire schedule information of an infant from a schedule managing server and may operate the sensor in the infant detecting mode based on the schedule information of the infant.

According to another aspect of the present disclosure, a method of detecting an object in a vehicle includes monitoring, by a controller, start-up of the vehicle and a state of a door. The method also includes operating, by the controller, an interior detecting sensor of the vehicle in an infant detecting mode when an engine of the vehicle is turned off and the door is locked. The method also includes operating, by the controller, the interior detecting sensor of the vehicle in an intrusion detecting mode when no infant is detected.

According to an embodiment of the present disclosure, operating the interior detecting sensor of the vehicle in the infant detecting mode may include setting a detection intensity of the interior detecting sensor to a maximum detection intensity, setting a detection period of the interior detecting sensor to a shortest detection period, and setting a detection speed of the interior detecting sensor to a maximum speed.

According to an embodiment of the present disclosure, operating the interior detecting sensor of the vehicle in the intrusion detecting mode may include setting a detection intensity of the interior detecting sensor to a minimum detection intensity, setting a detection period of the interior detecting sensor to a longest detection period, and setting a detection speed of the interior detecting sensor to a minimum speed.

According to an embodiment of the present disclosure, the method may further include notifying, by an output device, a driver of detection of the infant or detection of an intruder when the interior detecting sensor detects the infant or the intruder. The method may further include communicating, by a communication device, with a portable terminal of the driver when the interior detecting sensor detects the infant or the intruder.

According to an embodiment of the present disclosure, notifying the driver of the detection of an infant or the detection of an intruder may include outputting, by the output device, a first pattern alarm when the interior detecting sensor detects the infant and may include outputting, by the output device, a second pattern alarm when the interior detecting sensor detects the intruder.

According to the embodiment of the present disclosure, outputting, by the output device, the first pattern alarm may include outputting a warning sound in a first period, flickering emergency lights of the vehicle, and/or outputting an infant notification text.

According to an embodiment of the present disclosure, communicating with the portable terminal of the driver may include transmitting at least one of a message notifying of the presence of an infant or an interior image of the vehicle to the portable terminal of the driver.

According to an embodiment of the present disclosure, outputting, by the output device, the second pattern alarm may include outputting a warning sound in a second period, flickering emergency lights of the vehicle, and/or outputting an intruder notification text.

According to an embodiment of the present disclosure, communicating with the portable terminal of the driver may include transmitting at least one of a message notifying of the presence of an infant or an interior image of the vehicle to the portable terminal of the driver.

According to an embodiment of the present disclosure, the method may further include acquiring, by the controller, schedule information of an infant from a schedule managing server and operating, by the controller, the interior detecting sensor in the infant detecting mode based on the schedule information of the infant.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
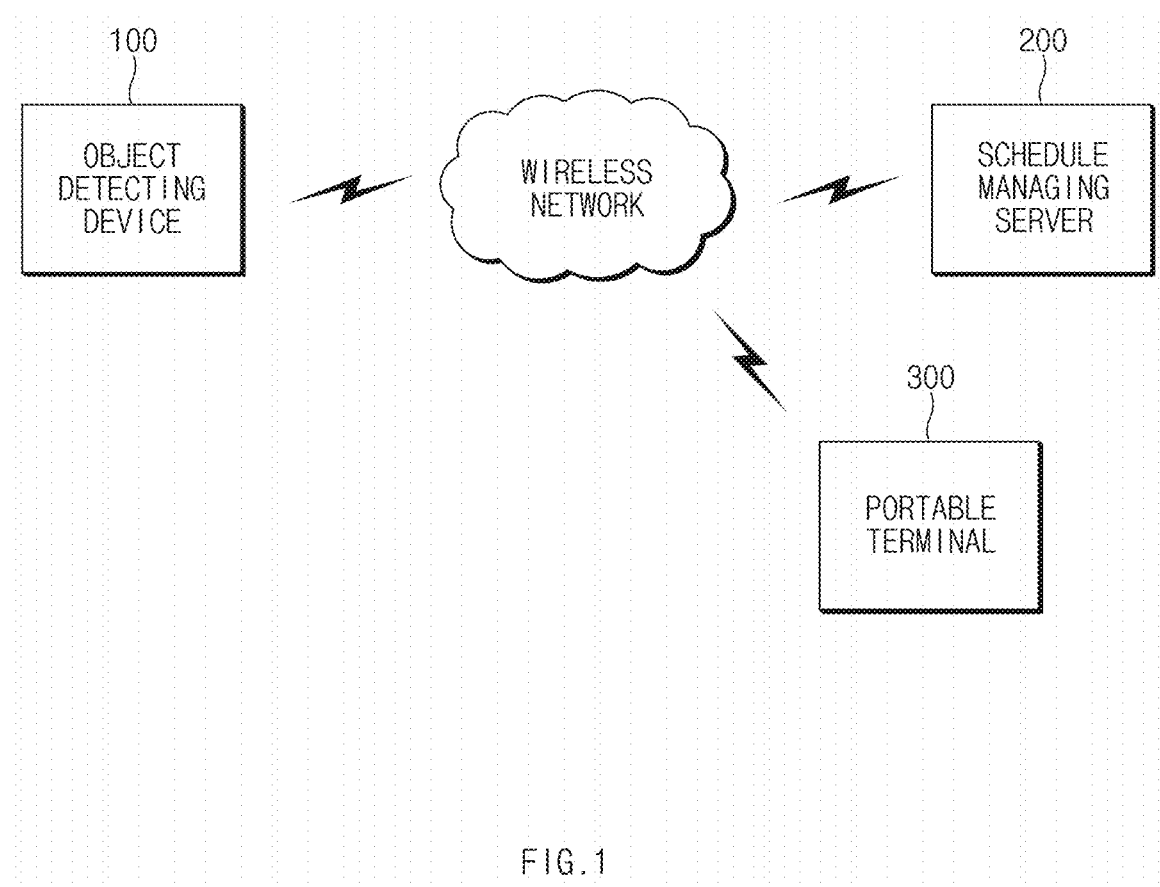
FIG. 1 is a view of a system for detecting an object in a vehicle according to an embodiment of the present disclosure.

Hereinafter, some embodiments of the present disclosure are described in detail with reference to the drawings.

Regarding reference numerals to components of each drawing, it should be noted that identical or equivalent components are designated by an identical numeral even when the components are displayed on other drawings. Further, in describing the embodiments of the present disclosure, a detailed description of the related known configurations or functions has been omitted where it has been determined that the detailed description would have interfered with understanding the embodiments of the present disclosure.

In the description of the components of the embodiments of the present disclosure, the terms such as first, second, A, B, (a) and (b) may be used. These terms are merely intended to distinguish one component from other components, and the terms do not limit the nature, order, or sequence of the components. Unless otherwise defined, all terms s including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein. When a component, device, element, or the like of the present disclosure is described as having a purpose or performing an operation, function, or the like, the component, device, element, or the like should be considered herein as being "configured to" meet that purpose or to perform that operation or function. Each component, device, element, and the like may separately embody or be included with a processor and a memory, such as a non-transitory computer readable media, as part of the apparatus.

FIG. 1 is a view of a system for detecting an object in a vehicle according to an embodiment of the present disclosure.

As illustrated in FIG. 1, the system for detecting an object in a vehicle according to an embodiment of the present disclosure may include an object detecting device 100, a schedule managing server 200, and a portable terminal 300.

In the above components, first, the object detecting device 100 may monitor start-up of a vehicle and a state of a door, may operate an interior detecting sensor of the vehicle in an infant detecting mode when an engine of the vehicle is turned off and the door is locked, and may operate the interior detecting sensor of the vehicle in an intrusion detecting mode when an infant is not detected.

The object detecting device 100 may control (or set) performance of the interior detecting sensor of the vehicle to a maximum values, settings, levels, intensity, or the like (i.e., value or values) when the interior detecting sensor of the vehicle operates in the infant detecting mode and may control the performance of the interior detecting sensor of the vehicle to a minimum values when the interior detecting sensor of the vehicle operates in the intrusion detecting mode.

Here, the object detecting device 100 may control a detection intensity, a detection period, and a detection speed (i.e., a processing speed) of the interior detecting sensor of the vehicle to the maximum values when the interior detecting sensor of the vehicle operates in the infant detecting mode and may control the detection intensity, the detection period, and the detection speed of the interior detecting sensor of the vehicle to the minimum values when the interior detecting sensor of the vehicle operates in the intrusion detecting mode.

The object detecting device 100 may output a first pattern alarm when an infant is detected while the interior detecting sensor of the vehicle operates in the infant detecting mode. The device 100 may allow the interior detecting sensor of the vehicle to operate in the intrusion detecting mode when an infant is not detected during a preset time. The device 100 may output a second pattern alarm when the interior detecting sensor of the vehicle detects an intruder while operating in intrusion detecting mode.

Here, the first pattern alarm may include at least one or more of an alert sound in a first period (e.g., 1 second ON and then 1.5 seconds OFF), flickering of emergency lights of the vehicle, transmission of text messages such as "there is an infant in the vehicle" to the portable terminal 300 of a driver, notification of the presence of an infant through a display positioned outside the vehicle, transmission of video of the interior of the vehicle to the portable terminal 300 of the driver, and/or the like. Further, the second pattern alarm may include an alert sound in a second period (e.g., 0.45 seconds ON and then 0.45 seconds OFF), the flickering of the emergency lights of the vehicle, transmission of text messages such as "an intruder is detected in the vehicle" to the portable terminal 300 of the driver, notification of the presence of an intruder through the display positioned outside the vehicle, the transmission of video of the interior of the vehicle to the portable terminal 300 of the driver, and/or the like.

The object detecting device 100 may communicate with the schedule managing server 200 through a wireless network and may determine whether to operate the interior detecting sensor of the vehicle in the infant detecting mode using schedule information of the infant, which is acquired by the schedule managing server 200.

The schedule managing server 200 may receive and manage schedules of the driver himself/herself and his/her family (including the infant) from the driver. For example, the schedule of the infant may include a route and time for which the infant moves from home to a kindergarten, a time at which the infant arrives at the kindergarten, a route and time for which the infant moves from kindergarten to home, a time at which the infant arrives at home, and/or the like.

The schedule managing server 200 may verify the object detecting device 100 mounted on the vehicle of the driver and provide the schedule of the infant of the driver to the object detecting device 100.

Figure 2:
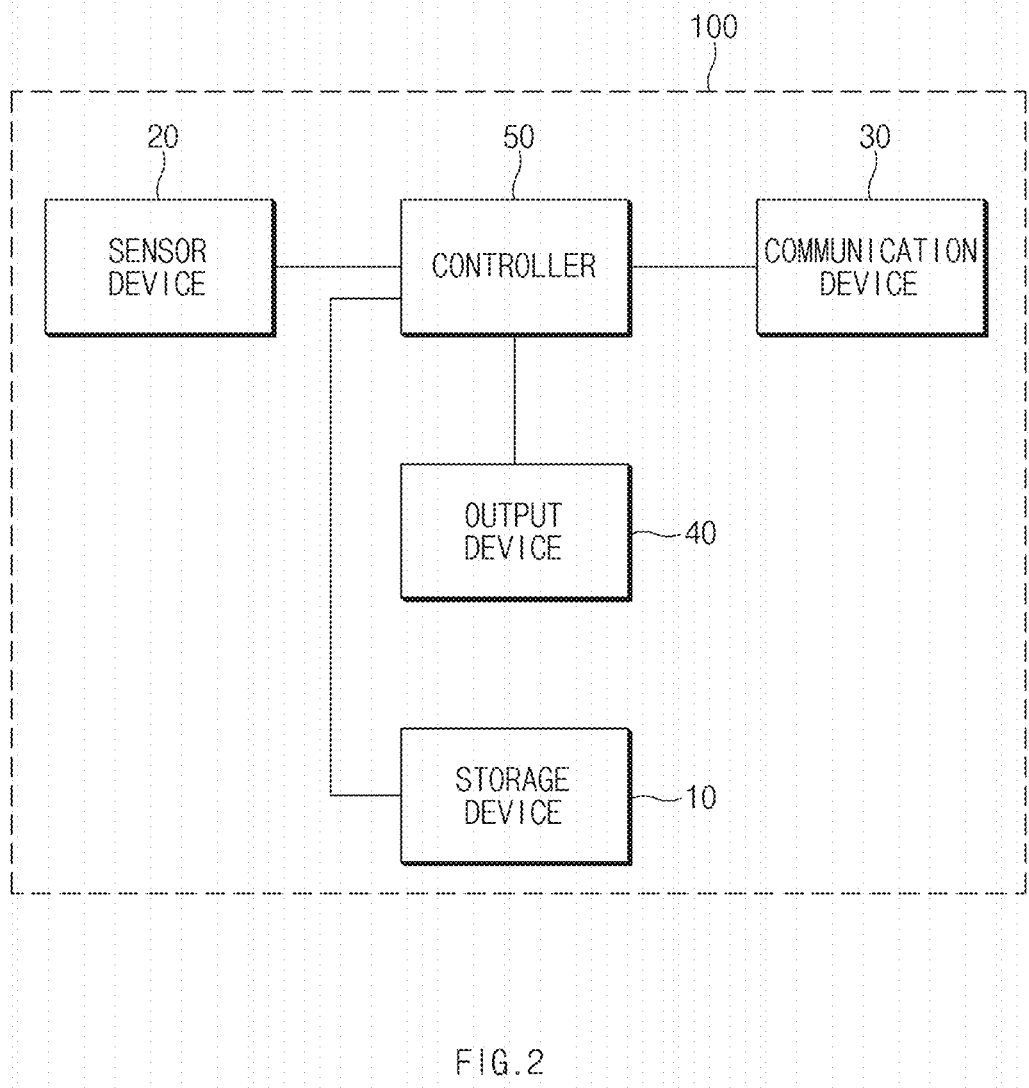
FIG. 2 is a diagram illustrating an apparatus for detecting an object in a vehicle according to an embodiment of the present disclosure.

FIG. 2 is a diagram illustrating an apparatus for detecting an object in a vehicle according to an embodiment of the present disclosure.

As illustrated in FIG. 2, the object detecting device 100 in a vehicle according to an embodiment of the present disclosure may include a storage device 10, a sensor device 20, a communication device 30, an output device 40, and a controller 50. In this case, according to a method of implementing the object detecting device 100 in a vehicle according to an embodiment of the present disclosure, respective components may be combined with each other to be implemented as one component or some components may be omitted.

In describing the respective components, first, the storage device 10 may store various logics, algorithms, and programs required for operating a process of monitoring the start-up of the vehicle and the state of the door. The logics, algorithms, and programs may be also required for operating the interior detecting sensor of the vehicle in the infant detecting mode when the engine of the vehicle is turned off and the door is locked. The logics, algorithms, and programs may be also required for operating the interior detecting sensor of the vehicle in the intrusion detecting mode when the infant is not detected.

The storage device 10 may store various logics, algorithms, and programs required for a process of controlling the performance of the interior detecting sensor of the vehicle to the maximum values when the interior detecting sensor of the vehicle operates in the infant detecting mode. The logics, algorithms, and programs may be also required for controlling the performance of the interior detecting sensor of the vehicle to the minimum values when the interior detecting sensor of the vehicle operates in the intrusion detecting mode.

The storage device 10 may store various logics, algorithms, and programs required for a process of controlling the detection intensity, the detection period, and the detection speed (i.e., the processing speed) of the interior detecting sensor of the vehicle to the maximum values when the interior detecting sensor of the vehicle operates in the infant detecting mode. The logics, algorithms, and programs may be also required for controlling the detection intensity, the detection period, and the detection speed of the interior detecting sensor of the vehicle to the minimum values when the interior detecting sensor of the vehicle operates in the intrusion detecting mode.

The storage device 10 may store various logic, algorithms, and programs required for outputting the first pattern alarm when the infant is detected while the interior detecting sensor of the vehicle operates in the infant detecting mode. The logics, algorithms, and programs may be also required for allowing the interior detecting sensor of the vehicle to operate in the intrusion detecting mode when the infant is not detected during a preset time. The logics, algorithms, and programs may be also required for outputting the second pattern alarm when the interior detecting sensor of the vehicle detects the intruder while operating in intrusion detecting mode.

Figure 3:
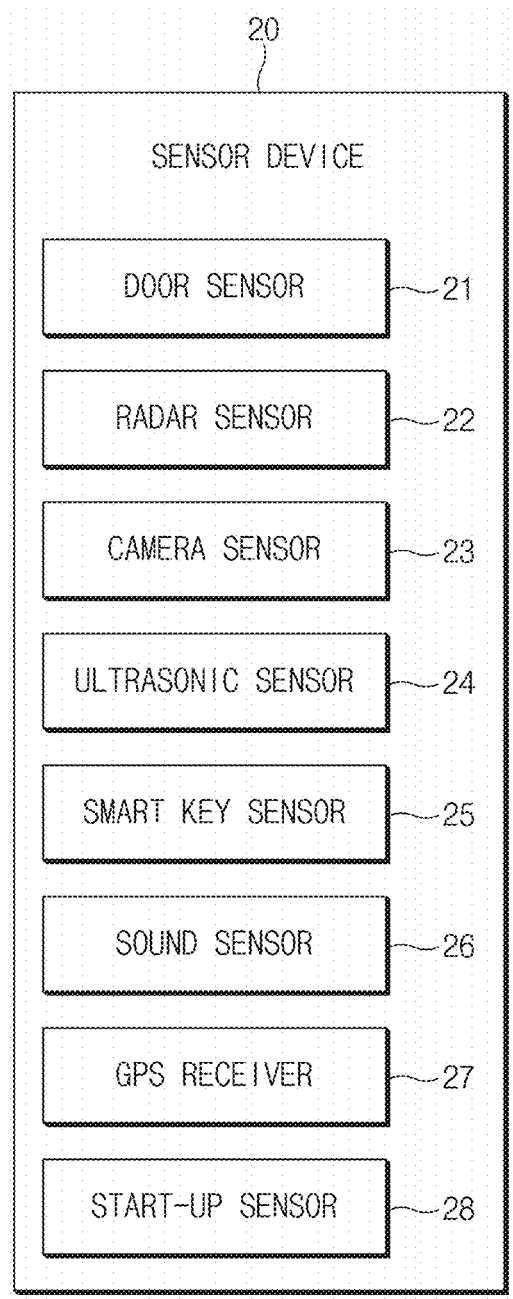
FIG. 3 is a view illustrating a detailed configuration of a sensor device provided in an apparatus for detecting an object in a vehicle according to an embodiment of the present disclosure.

The sensor device 20 refers to a plurality of sensors mounted on the vehicle and may include a door sensor 21, a radar sensor 22, a camera sensor 23, an ultrasonic sensor 24, a smart key sensor 25, a sound sensor 26, a global positioning system (GPS) receiver 27, a start-up sensor 28, and/or the like as illustrated in FIG. 3.

Here, the door sensor 21 may include a driver door sensor, a passenger door sensor, a rear seat left door sensor, and a rear seat right door sensor, may detect opening and closing of the door, and may sense locking and unlocking of the door.

The radar sensor 22 may include an antenna and a micro control unit (MCU). The antenna may be positioned on an upper surface of a printed circuit board and may be equipped with three transmitting antennas TX, four receiving antennas RX, and a transceiver. In this case, the number of transmitting antennas and the number of receiving antennas may change depending on intention of a designer. Further, the MCU may be electrically connected to the transceiver, the MCU may control the transceiver to activate or deactivate the transmitting antennas and the receiving antennas, and the transceiver may selectively activate or deactivate the transmitting antennas and the receiving antennas.

The radar sensors 22 may be mounted on a front side, a left rear side, a right rear side, and/or an interior of the vehicle. In this case, the radar sensor mounted inside the vehicle is referred to as the interior detecting sensor, and the interior detecting sensor may even detect movement of a body (e.g., an abdomen, a chest, or the like) according to breathing of the infant.

The camera sensor 23, which is a camera that captures surrounding images of the vehicle, may include a front camera that captures a front side of the vehicle, a right camera that captures of a right side of the vehicle, a left camera that captures a left side of the vehicle, a rear camera that captures a rear side of the vehicle, and/or an interior camera that captures an interior of the vehicle.

The ultrasonic sensor 24, which is a sensor that detects an obstacle around the vehicle, may include a front right ultrasonic sensor that detects an obstacle positioned on a front right side of the vehicle, a front left ultrasonic sensor that detects an obstacle positioned on a front left side of the vehicle, and/or a rear ultrasonic sensor that detects an obstacle positioned on a rear side of the vehicle.

The smart key sensor 25, which is a sensor provided in a smart key system, may recognize a smart key of the driver who is close to the vehicle.

The sound sensor 26 may be implemented as a microphone provided inside the vehicle and may detect a sound generated inside the vehicle.

The GPS receiver 27 may obtain position information of the vehicle. The GPS receiver 27 may be provided in a navigation device mounted on the vehicle. The navigation device may provide a position (e.g., the kindergarten, home, or the like) of the vehicle to the controller 50.

The start-up sensor 28 may detect whether the vehicle is started up. In this case, the start-up sensor 28 may detect whether an engine is started up in the case of an internal combustion engine vehicle and may detect whether the vehicle is ready for departure in the case of an electric vehicle.

Referring back to FIG. 2, the communication device 30, which is a module that provides a communication interface between the schedule managing server 200 and the portable terminal 300 of the driver, may receive schedule information of the driver or the infant from the schedule managing server 200 or may transmit a text message or an interior image of the vehicle to the portable terminal 300 of the driver. The communication device 30 may include at least one of a mobile communication module, a wireless Internet module, or a short-range communication module.

The mobile communication module may communicate with the schedule managing server 200 and the portable terminal 300 through a mobile communication network. The network may be established according to technical standards or communication methods for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTEA), or the like).

The wireless Internet module, which is a module for wireless Internet access, may communicate with the schedule managing server 200 and the portable terminal 300 through wireless local area network (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), or the like.

The short-range communication module may support short-range communication with the schedule managing server 200 and the portable terminal 300 by using at least one of Bluetooth™, radio frequency identification (RFID), infrared data association (IrDA), ultra wideband (UWB), ZigBee, near field communication (NFC), and/or wireless universal serial bus (Wireless USB).

The output device 40, which is a module that notifies the driver of the presence of the infant or the intruder, may include a horn that outputs a warning sound, emergency lights and headlights of the vehicle, a display mounted inside the vehicle (e.g., a cluster, an audio video navigation (AVN) system, or the like), a display mounted on an exterior of the vehicle, or the like.

The controller 50 may be electrically connected to the respective components and may perform overall control so that the components may normally perform functions thereof. The controller 50 may be implemented in the form of hardware, may be implemented in the form of software, or may be implemented in the form in which the hardware and the software are combined. It is desirable that the controller 50 may be implemented as a microprocessor, but the present disclosure is not limited thereto.

The controller 50 may monitor the start-up of the vehicle and the state of the door based on the start-up sensor 28 and the door sensor 21. The controller 50 may operate the interior detecting sensor of the vehicle in the infant detecting mode when the engine of the vehicle is turned off and the door is locked. The controller 50 may operate the interior detecting sensor of the vehicle in the intrusion detecting mode when an infant is not detected. In this case, the controller 50 may control the performance of the interior detecting sensor of the vehicle to the maximum values when the interior detecting sensor of the vehicle operates in the infant detecting mode and may control the performance of the interior detecting sensor of the vehicle to the minimum values when the interior detecting sensor of the vehicle operates in the intrusion detecting mode.

Figure 4:
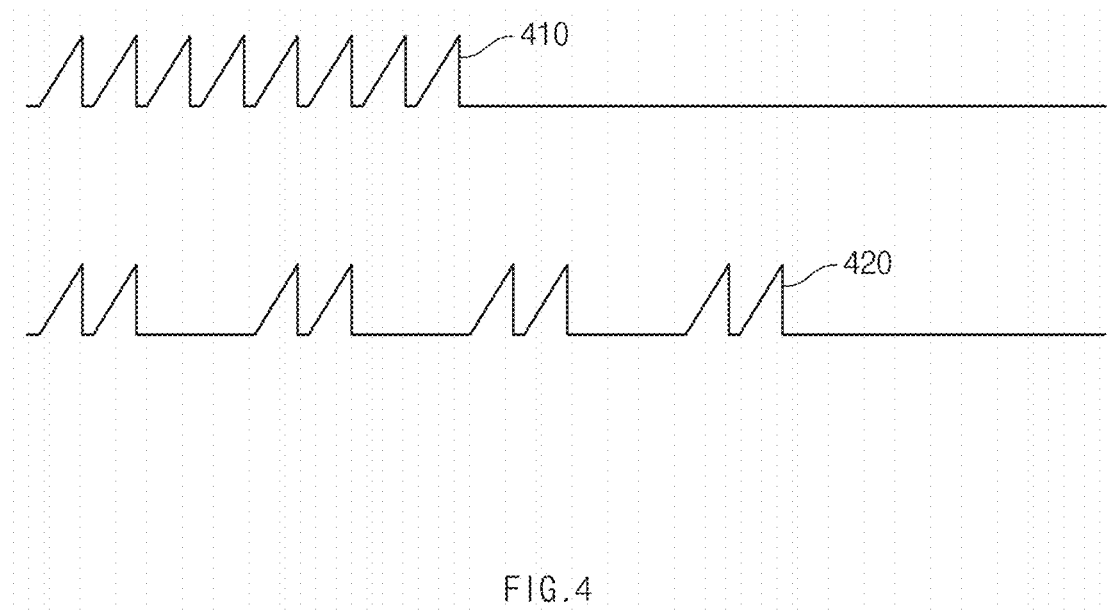
FIG. 4 is a view illustrating a detection cycle according to each mode of an interior detecting sensor provided in an apparatus for detecting an object in a vehicle according to an embodiment of the present disclosure.

For example, when the interior detecting sensor of the vehicle operates in the infant detecting mode, the controller 50 may control the detection intensity, the detection period, and the detection speed of the interior detecting sensor of the vehicle to the maximum values. In other words, the controller 50 may set the detection intensity (i.e., radiation power intensity) of the interior detecting sensor to the maximum intensity, may set a detection period 410 to the shortest period as illustrated in FIG. 4, and may set the detection speed to a maximum speed.

As another example, when the interior detecting sensor of the vehicle operates in the intrusion detecting mode, the controller 50 may control the detection intensity, the detection period, and the detection speed of the interior detecting sensor of the vehicle to the minimum values. In other words, the controller 50 may set the detection intensity (i.e., power intensity) of the interior detecting sensor to the minimum intensity, may set a detection period 420 to the longest period as illustrated in FIG. 4, and may set the detection speed to a minimum speed. In this case, the detection period 410 may be in a range of, for example, 0.01 seconds to 1 second, and the detection period 420 may be in a range of, for example, 10 seconds to 100 seconds.

When the interior detecting sensor of the vehicle operates in the infant detecting mode, in a process of detecting an infant based on movement information obtained through the interior detecting sensor, the controller 50 may determine whether an infant is present further in consideration of an interior sound of the vehicle, which is obtained through the sound sensor 26.

The controller 50 may output the first pattern alarm when an infant is detected while the interior detecting sensor of the vehicle operates in the infant detecting mode. The controller 50 may also allow the interior detecting sensor of the vehicle to operate in the intrusion detecting mode when an infant is not detected during a preset time (e.g., three seconds). The controller 50 may also output the second pattern alarm when the interior detecting sensor of the vehicle detects an intruder while operating in the intrusion detecting mode.

Here, the controller 50 may control the output device 40 to output the alert sound in the first period (e.g., 1 second ON and then 1.5 seconds OFF). The controller 50 may also flicker the emergency lights of the vehicle. The controller 50 may also output an infant notification text or notification symbol through a display positioned outside the vehicle as the first pattern alarm. The controller 50 may also control the communication device 30 to transmit a text message such as "there is an infant in the vehicle" to the portable terminal 300 of the driver or transmit interior image of the vehicle to the portable terminal 300 of the driver.

Here, the controller 50 may control the output device 40 to output the alert sound in the second period (e.g., 0.45 seconds ON and then 0.45 seconds OFF). The controller 50 may also flicker the emergency lights of the vehicle. The controller 50 may also output an intruder notification text or notification symbol through the display positioned outside the vehicle as the second pattern alarm. The controller 50 may also control the communication device 30 to transmit a text message such as "an intruder is detected in the vehicle" to the portable terminal 300 of the driver or transmit the interior image of the vehicle to the portable terminal 300 of the driver.

The controller 50 may obtain the schedule information of the infant from the schedule managing server 200 through the communication device 30. The controller 50 may also determine whether the interior detecting sensor of the vehicle operates in the infant detecting mode using the schedule information of the infant.

For example, when an infant arrives at the kindergarten or when the infant arrives at home on the schedule information of the infant, the interior detecting sensor of the vehicle may operate in the infant detecting mode.

Figure 5:
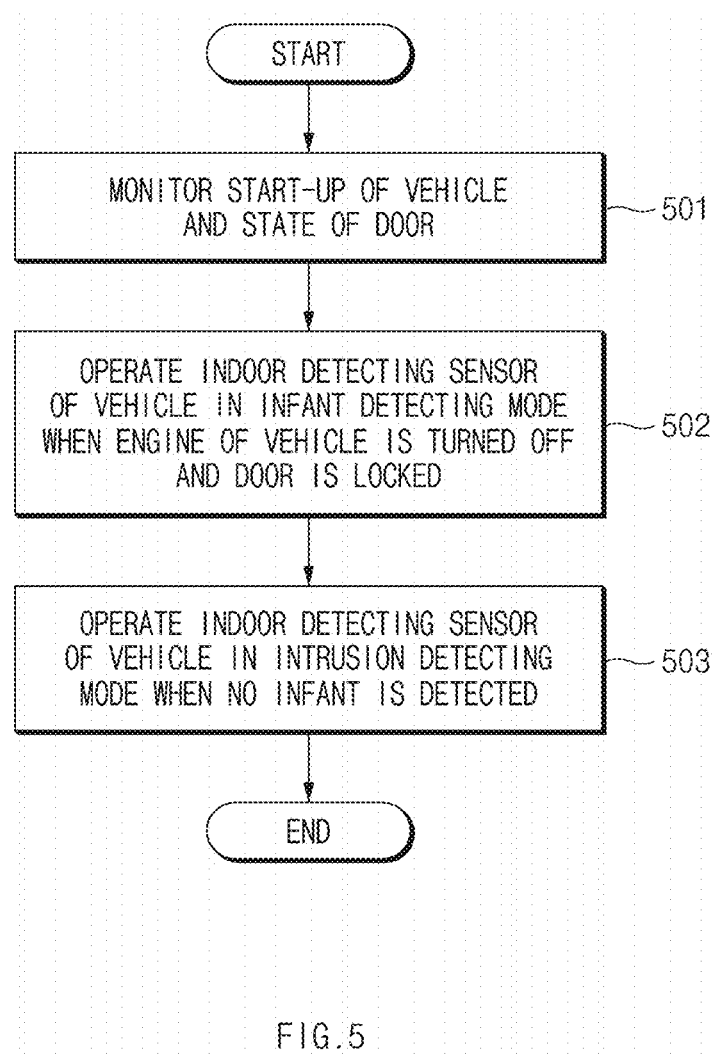
FIG. 5 is a flowchart illustrating a method of detecting an object in a vehicle according to an embodiment of the present disclosure.

FIG. 5 is a flowchart illustrating a method of detecting an object in a vehicle according to an embodiment of the present disclosure.

First, the controller 50 monitors the start-up of the vehicle and the state of the door (501).

Thereafter, when the engine of the vehicle is turned off and the door is locked, the controller 50 operates the interior detecting sensor of the vehicle in the infant detecting mode (502).

Thereafter, when an infant is not detected, the controller 50 operates the interior detecting sensor of the vehicle in the intrusion detecting mode (503). In this case, when an infant is detected, the controller 50 may control the output device 40 to output the first pattern alarm.

Thereafter, when an intruder is detected, the controller 50 may control the output device 40 to output the second pattern alarm.

Figure 6:
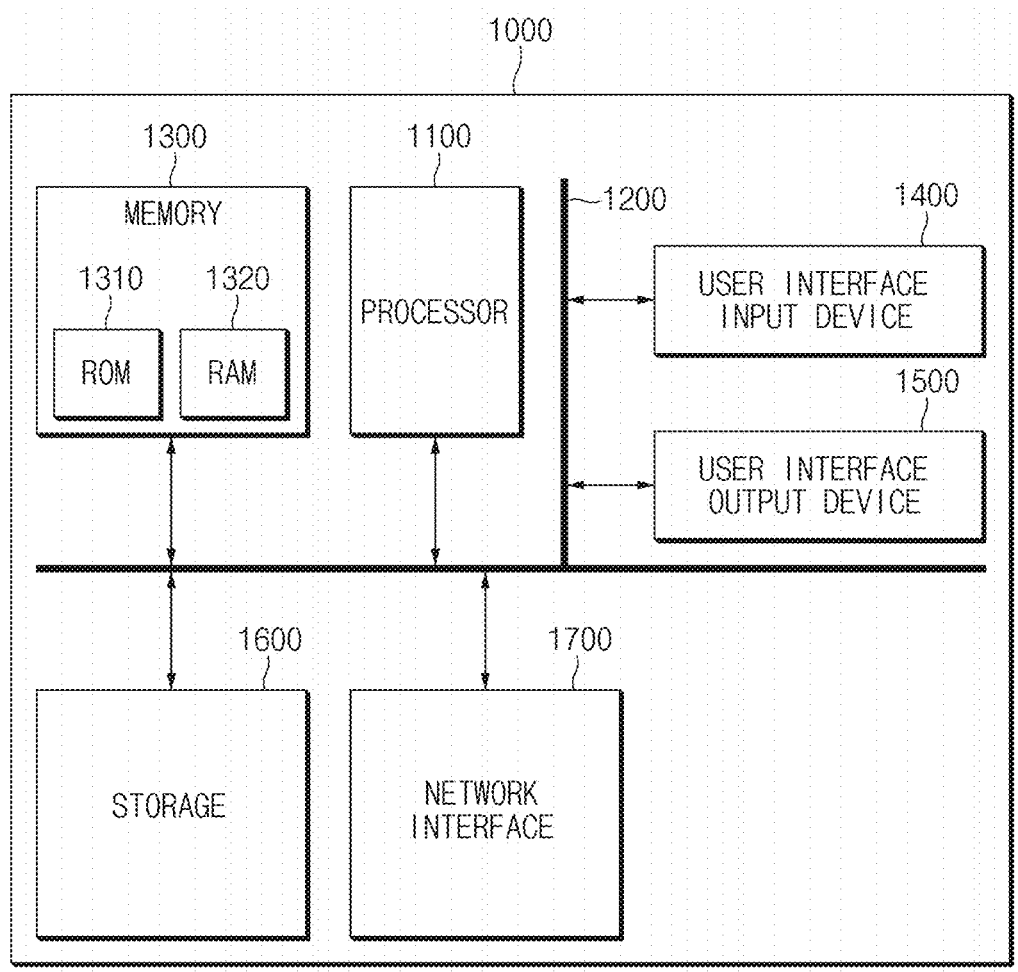
FIG. 6 is a block diagram illustrating a computing system for executing the method of detecting an object in a vehicle according to each embodiment of the present disclosure.

FIG. 6 is a block diagram illustrating a computing system for executing the method of detecting an object in a vehicle according to each embodiment of the present disclosure.

Referring to FIG. 6, the method of detecting an object in a vehicle according to an embodiment of the present disclosure may be also implemented through a computing system 1000. The computing system 1000 may include at least one processor 1100, a memory 1300, a user interface input device 1400, a user interface output device 1500, storage 1600, and a network interface 1700, which are connected through a system bus 1200.

The processor 1100 may be a central processing unit (CPU) or a semiconductor device that processes commands stored in the memory 1300 and/or storage 1600. The memory 1300 and the storage 1600 may include various types of volatile or nonvolatile storage media. For example, the memory 1300 may include a read only memory (ROM) 1310 and a random access memory (RAM) 1320.

Thus, operations of a method or algorithm described in connection with the embodiments disclosed herein may be directly implemented in hardware, a software module, or a combination of the two components, which are executed by the processor 1100. The software module may reside in a storage medium (i.e., the memory 1300 and/or the storage 1600) such as a RAM, a flash memory, a ROM, an erasable e programming ROM (EPROM), an electrically erasable and programmable ROM (EEPROM), a register, a hard disk, a removable disk, and a compact disk (CD)-ROM. A storage medium may be coupled to the processor 1100, and the processor 1100 may read information from the storage medium and write information in the storage medium. In another manner, the storage medium may be integrated with the processor 1100. The processor 1100 and the storage medium may reside inside an application-specific integrated circuit (ASIC). The ASIC may reside inside a user terminal. In another manner, the processor 1100 and the storage medium may reside as an individual component inside the user terminal.

According to an embodiment of the present disclosure, start-up of a vehicle and a state of a door are monitored. An interior detecting sensor of the vehicle operates in an infant detecting mode when an engine of the vehicle is turned off and the door is locked. The interior detecting sensor of the vehicle operates in an intrusion detecting mode when no infant is detected. Thus, an infant in the vehicle may be quickly and accurately detected, and an intruder in the vehicle may be detected for a long period of time using low power.

The above description merely illustrates the technical spirit of the present disclosure. Those having ordinary skill in the art to which the present disclosure belongs may make various modifications and changes without departing from the essential features of the present disclosure. Thus, the embodiments disclosed in the present disclosure are not intended to limit the technology spirit of the present disclosure but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. An apparatus for detecting an object in a vehicle, the apparatus comprising:
    a sensor configured to detect movement of the object positioned in an interior of the vehicle; and
    a controller configured to
        monitor start-up of the vehicle and a state of a door,
        operate the sensor in an infant detecting mode when an engine of the vehicle is turned off and the door is locked, and
        operate the sensor in an intrusion detecting mode when no infant is detected,
    wherein, when the sensor operates in the infant detecting mode, the controller is further configured to:
        set a detection intensity of the sensor to a maximum detection intensity;
        set a detection period of the sensor to a shortest detection period; and
        set a detection speed of the sensor to a maximum speed.

2. The apparatus of claim 1, wherein, when the sensor operates in the intrusion detecting mode, the controller is further configured to:
    set a detection intensity of the sensor to a minimum detection intensity;
    set a detection period of the sensor to a longest detection period; and
    set a detection speed of the sensor to a minimum speed.

3. The apparatus of claim 1, further comprising:
    an output device configured to notify a driver of an infant or an intruder when the sensor detects the infant or the intruder; and
    a communication device configured to communicate with a portable terminal of the driver.

4. The apparatus of claim 3, wherein the output device is further configured to:
    output a first pattern alarm when the sensor detects the infant; and
    output a second pattern alarm when the sensor detects the intruder.

5. The apparatus of claim 4, wherein, as the first pattern alarm, the output device is further configured to:
    output a warning sound in a first period;
    flicker emergency lights of the vehicle; and
    output an infant notification text.

6. The apparatus of claim 5, wherein the communication device is further configured to transmit at least one of a message notifying of a presence of the infant or an interior image of the vehicle to the portable terminal of the driver.

7. The apparatus of claim 4, wherein, as the second pattern alarm, the output device is further configured to:
    output a warning sound in a second period;
    flicker emergency lights of the vehicle; and
    output an intruder notification text.

8. The apparatus of claim 7, wherein the communication device is further configured to transmit at least one of a message notifying of presence of the intruder or an interior image of the vehicle to the portable terminal of the driver.

9. The apparatus of claim 1, wherein the controller is further configured to:
    acquire schedule information of the infant from a schedule managing server; and
    operate the sensor in the infant detecting mode based on the schedule information of the infant.

10. A method of detecting an object in a vehicle, the method comprising:
    monitoring, by a controller, start-up of the vehicle and a state of a door;
    operating, by the controller, an interior detecting sensor of the vehicle in an infant detecting mode when an engine of the vehicle is turned off and the door is locked; and
    operating, by the controller, the interior detecting sensor of the vehicle in an intrusion detecting mode when no infant is detected,
    wherein operating the interior detecting sensor of the vehicle in the infant detecting mode includes:
        setting a detection intensity of the interior detecting sensor to a maximum detection intensity;
        setting a detection period of the interior detecting sensor to a shortest detection period; and
        setting a detection speed of the interior detecting sensor to a maximum speed.

11. The method of claim 10, wherein operating the interior detecting sensor of the vehicle in the intrusion detecting mode includes:
- setting a detection intensity of the interior detecting sensor to a minimum detection intensity;
- setting a detection period of the interior detecting sensor to a longest detection period; and
- setting a detection speed of the interior detecting sensor to a minimum speed.

12. The method of claim 10, further comprising:
- notifying, by an output device, a driver of detection of an infant or detection of an intruder when the interior detecting sensor detects the infant or the intruder; and
- communicating, by a communication device, with a portable terminal of the driver when the interior detecting sensor detects the infant or the intruder.

13. The method of claim 12, wherein notifying the driver of the detection of the infant or the detection of the intruder includes:
- outputting, by the output device, a first pattern alarm when the interior detecting sensor detects the infant; and
- outputting, by the output device, a second pattern alarm when the interior detecting sensor detects the intruder.

14. The method of claim 13, wherein outputting, by the output device, the first pattern alarm includes:
- outputting a warning sound in a first period;
- flickering emergency lights of the vehicle; and
- outputting an infant notification text.

15. The method of claim 14, wherein communicating with the portable terminal of the driver includes transmitting at least one of a message notifying of presence of the infant or an interior image of the vehicle to the portable terminal of the driver.

16. The method of claim 13, wherein outputting, by the output device, the second pattern alarm includes:
- outputting a warning sound in a second period;
- flickering emergency lights of the vehicle; and
- outputting an intruder notification text.

17. The method of claim 16, wherein communicating with the portable terminal of the driver includes transmitting at least one of a message notifying of presence of the intruder or an interior image of the vehicle to the portable terminal of the driver.

18. The method of claim 10, further comprising:
- acquiring, by the controller, schedule information of the infant from a schedule managing server; and
- operating, by the controller, the interior detecting sensor in the infant detecting mode based on the schedule information of the infant.

19. An apparatus for detecting an object in a vehicle, the apparatus comprising:
- a sensor configured to detect movement of the object positioned in an interior of the vehicle; and
- a controller configured to
  - monitor start-up of the vehicle and a state of a door,
  - operate the sensor in an infant detecting mode when an engine of the vehicle is turned off and the door is locked, and
  - operate the sensor in an intrusion detecting mode when no infant is detected,
- wherein, when the sensor operates in the intrusion detecting mode, the controller is further configured to:
  - set a detection intensity of the sensor to a minimum detection intensity;
  - set a detection period of the sensor to a longest detection period; and
  - set a detection speed of the sensor to a minimum speed.

20. The apparatus of claim 19, further comprising:
- an output device configured to notify a driver of an infant or an intruder when the sensor detects the infant or the intruder; and
- a communication device configured to communicate with a portable terminal of the driver.

* * * * *